US012083630B2

(12) United States Patent
Johannesen

(10) Patent No.: US 12,083,630 B2
(45) Date of Patent: Sep. 10, 2024

(54) AUTOMATED WELDING TORCH POSITIONER

(71) Applicant: LINCOLN GLOBAL, INC., Santa Fe Springs, CA (US)

(72) Inventor: Dale Andrew Johannesen, Queensland (AU)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1063 days.

(21) Appl. No.: 16/993,602

(22) Filed: Aug. 14, 2020

(65) Prior Publication Data

US 2021/0078116 A1 Mar. 18, 2021

Related U.S. Application Data

(60) Provisional application No. 62/901,974, filed on Sep. 18, 2019.

(51) Int. Cl.
*B23K 37/02* (2006.01)

(52) U.S. Cl.
CPC ...... *B23K 37/0282* (2013.01); *B23K 37/0211* (2013.01); *B23K 37/0247* (2013.01)

(58) Field of Classification Search
CPC ............ B23K 37/0211; B23K 37/0282; B23K 37/0294; B23K 37/0288; B23Q 1/621; B25J 9/023; B25J 11/00; B25J 11/0055; B25J 15/0066; B25J 18/02; B25J 19/0016; B25J 5/007; B25J 5/02; B25J 9/0084

See application file for complete search history.

(56) References Cited

U.S. PATENT DOCUMENTS 3,031,566 A * 4/1962 Wuesthoff .......... B23K 37/0229
219/60 R
2004/0265076 A1 12/2004 Buttrick, Jr. et al.
(Continued)

FOREIGN PATENT DOCUMENTS

CN 104043921 A * 9/2014 ......... B23K 37/0211
CN 104625362 A 5/2015
(Continued)

OTHER PUBLICATIONS

KR-20130095899-A English translation (2013) (Year: 2013).*
(Continued)

*Primary Examiner* — Eric S Stapleton
*Assistant Examiner* — Damon Joel David Alfaro
(74) *Attorney, Agent, or Firm* — Tucker Ellis LLP; Brad C. Spencer

(57) ABSTRACT

A welding system can include a carriage having a top surface and a bottom surface. A first set of wheels can be coupled to the top surface of the carriage, and a second set of wheels can be coupled to the top surface of the carriage, spaced apart from the first set of wheels to create a first beam channel. The welding system can further include a first beam that includes a rack extending along a side of the first beam. The first beam can extend through the first beam channel and engage with the first and second sets of wheels. The welding system can further include a first positioning motor that includes a pinion gear. The first positioning motor is removeably coupled to the carriage such that the pinion gear is positioned to engage the rack extending along the first beam.

12 Claims, 8 Drawing Sheets

(56) References Cited

U.S. PATENT DOCUMENTS

2008/0142667 A1\* 6/2008 German ................ A47B 97/04
                                              248/447.1
2014/0034714 A1   2/2014 Gatlin et al.
2019/0329365 A1\* 10/2019 Simon ................ B23K 37/0282

FOREIGN PATENT DOCUMENTS

| CN | 110011571 A | \* | 7/2019 | ............ H02K 11/20 |
| KR | 20130095899 A | \* | 8/2013 | |
| KR | 101573456 B1 | \* | 12/2015 | |

OTHER PUBLICATIONS

KR-101573456-B1 English translation (2015) (Year: 2015).\*
CN-110011571-A English translation (2019) (Year: 2019).\*
CN-104043921-A English translation (2014) (Year: 2014).\*
Examination Report from corresponding Australian Application No. 2020220111 mailed on Apr. 16, 2021, 5 pages.

\* cited by examiner

AUTOMATED WELDING TORCH POSITIONER

CROSS-REFERENCE TO RELATED APPLICATIONS

This application relates to and claims the benefit of U.S. Provisional Patent Application Ser. No. 62/901,974 filed on Sep. 18, 2019 entitled "AUTOMATED WELDING TORCH POSITIONER", which is incorporated herein by reference in its entirety.

TECHNICAL FIELD

In general, the present invention relates to a welding apparatus and, in particular, an automated welding torch positioner.

BACKGROUND

Certain welding systems are employed in harsh environments where conditions can cause electrical components, positioning motors, and gearboxes to become damaged, lose motion, and/or accuracy at critical times when a weld is to be completed within a limited timeframe. Often, due to these damaged components, a welding system can require extensive troubleshooting, fault finding, and deconstruction to change out damaged motors or gears.

SUMMARY

This summary is provided herein to help enable a general understanding of various aspects of exemplary, non-limiting embodiments that follow in the more detailed descriptions and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a welding system is provided. The welding system can include a carriage having a top surface and a bottom surface. The welding system can further include a first positioning motor removeably coupled to the top surface of the carriage, and a second positioning motor removeably coupled to the bottom surface of the carriage. The welding system can further include a first beam extending along a first axis and a second beam extending along a second axis. The first positioning motor is configured to releasably engage with the first beam to position the first beam along the first axis, and the second positioning motor is configured to releasably engage with the second beam to position the carriage along the second axis.

In certain embodiments, the top surface of the carriage includes a plurality of wheels arranged to define a first beam channel configured to receive the first beam. At least one wheel of the plurality of wheels is moveable from a first position on the top surface of the carriage to a second position on the top surface of the carriage such that the at least one wheel engages with the first beam while in the first position and does not engage with the first beam while in the second position.

In various, non-limiting embodiments, a carriage is provided. The carriage can include a top surface that includes a first positioning motor removeably coupled to the top surface. The carriage can further include a bottom surface that includes a second positioning motor removeably coupled to the bottom surface. The first positioning motor is configured to releasably engage with a first beam to position the first beam along a first axis, and the second positioning motor is configured to releasably engage with a second beam to position the carriage along a second axis.

In various, non-limiting embodiments, a welding system is provided. The welding system can include a carriage having a top surface and a bottom surface. A first set of wheels can be coupled to the top surface of the carriage, and a second set of wheels can be coupled to the top surface of the carriage, spaced apart from the first set of wheels to create a first beam channel. The welding system can further include a first beam that includes a rack extending along a side of the first beam. The first beam can extend through the first beam channel and engage with the first and second sets of wheels. The welding system can further include a first motor mount projecting from the top surface of the carriage, and a first positioning motor that includes a pinion gear. The first positioning motor is removeably coupled to the carriage such that the pinion gear is positioned to engage the rack extending along the first beam.

In certain embodiments, the welding system includes a first motor mount projecting from the top surface of the carriage. The first positioning motor further includes a pin aperture, and the first positioning motor is removeably coupled to the carriage by a first pin removeably inserted through the pin aperture of the first positioning motor and the first motor mount.

In certain embodiments, the welding system includes a first motor spring coupled to the top surface of the carriage. The first motor spring provides an upward bias to pivot the first positioning motor upward about the first pin to maintain contact between the pinion gear and the rack on the first beam.

In certain embodiments, a first wheel of the first set of wheels is mounted on the first motor mount.

In certain embodiments, a third set of wheels can be coupled to the bottom surface of the carriage, and a fourth set of wheels can be coupled to the bottom surface of the carriage, spaced apart from the third set of wheels to create a second beam channel. The welding system can further include a second beam that includes a rack extending along a side of the second beam. The second beam can extend through the second beam channel, perpendicular to the first beam, and engaging with the third and fourth sets of wheels. The welding system can further include a second positioning motor that includes a pinion gear. The second positioning motor is removeably coupled to the carriage such that the pinion gear is positioned to engage the rack extending along the second beam.

In certain embodiments, the welding system further includes a controller configured to provide position control signals to at least one of the first positioning motor or the second positioning motor.

In certain embodiments, the welding system further includes a second motor mount projecting from the bottom surface of the carriage. The second positioning motor further includes a pin aperture, and the second positioning motor is removeably coupled to the carriage by a second pin removeably inserted through the pin aperture of the second positioning motor and the second motor mount.

In certain embodiments, the first wheel of the third set of wheels is mounted on the second motor mount.

Certain embodiments of the welding system can further include a welding torch holder mounted to a telescoping rail. The telescoping rail can extend from the first beam and is configured to be locked in place with respect to the first beam by a locking screw that extends through the first beam.

Certain embodiments of the welding system can further include a first link pivotally attached at one end to the top surface of the carriage. A first wheel of the second set of wheels can be mounted to the first link. A second link can be pivotally attached at one end to the top surface of the carriage. A second wheel of the second set of wheels is mounted to the second link. A first spring can be coupled to at least one of the first link or the second link such that the first spring outwardly biases at least one of the first link or the second link towards a perimeter of the carriage. The welding system can further include a first locking lever having a post that extends through overlapping ends of the first link and the second link. The first locking lever is configured to clamp the first link and the second link in place while in a lowered position.

In certain embodiments, when the first locking lever is in a raised position, the first link and the second link are moveable between a first position where the second set of wheels are aligned to engage the first beam, and a second position where the second set of wheels are pivoted outwards towards the perimeter of the carriage.

In certain embodiments, when the first link and the second link are in the second position, the second set of wheels are disengaged from the first beam such that the first beam can be removed from the first beam channel.

These and other features of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Figure 1:
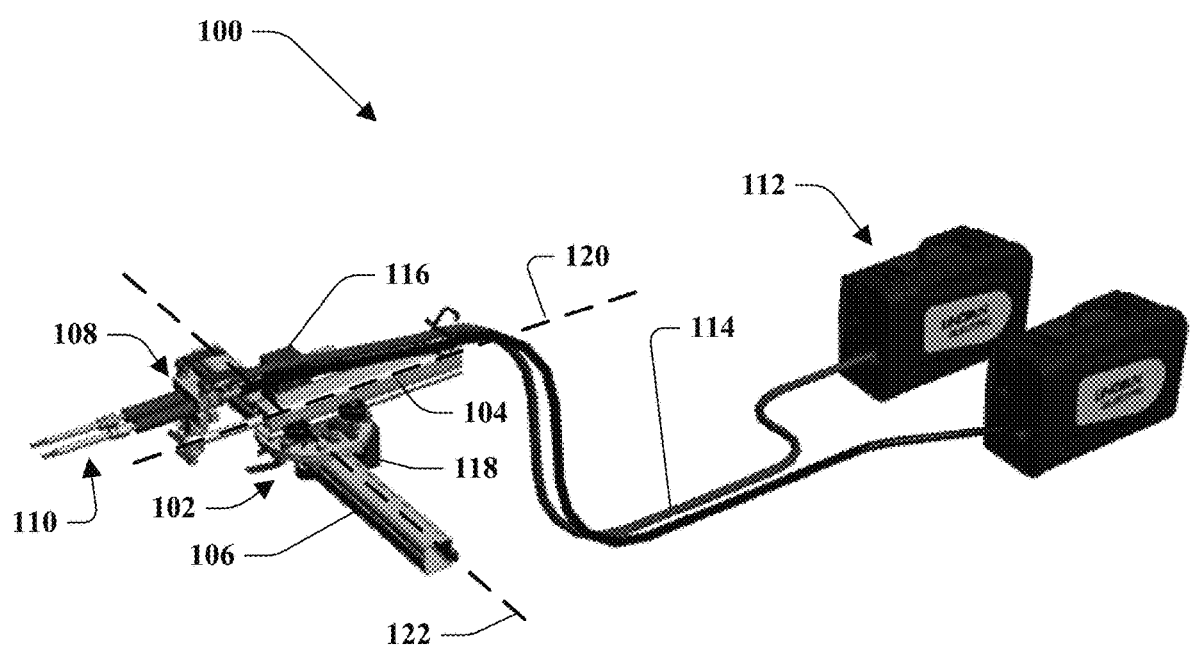
FIG. 1 is a perspective view of an exemplary welding system.

Certain welding systems, including two-axis automated welding systems, are used under harsh conditions that increase the frequency of damaged or faulty components. In some welding systems, significant time may be required to repair or replace damaged or faulty components. In accordance with various systems described herein, a welding system includes components (such as a positioning motor) that can be removed and replaced quickly with no tooling, allowing minimum loss of welding time. Components of the welding system are also lightweight and compact. The welding system further enables a user to adapt a position of a welding torch where extended distances are required to reach a weld position. The welding system described herein further enables quick positioning by manual movement and attachment of the carriage without tooling.

These and other advantages of the systems provided herein will be apparent to one of ordinary skill in the art.

With reference to the drawings, like reference numerals designate identical or corresponding parts throughout the several views. The inclusion of like elements in different views does not mean a given embodiment necessarily includes such elements or that all embodiments of the invention include such elements. The examples and figures are illustrative only and not meant to limit the invention, which is measured by the scope and spirit of the claims. Moreover, it should be understood that the drawings may not depict features to scale. The drawings may enlarge or exaggerate certain features to facilitate visualization.

FIG. 1 depicts a welding system 100. The welding system 100 includes a carriage 102 that can guide and position a first beam 104 along a first axis in a first direction, and can position itself along a second beam 106 that extends in a second direction along a second axis. A welding torch holder 108, which can hold one or more welding torches 110 can be coupled to the first beam 104. The welding system 100 can include a power supply 112. The power supply 112 can include one or more individual power supplies and can be, for example, a battery pack, an electric generator, or a power converter configured to transform a supply power to welding power. The power supply 112 is configured to supply welding power via supply cables 114 to the one or more welding torches 110. The one or more welding torches 110 can utilize the welding power to perform a welding operation on a workpiece.

The arrangement of the carriage 102, the first beam 104, and the second beam 106 allows the welding torch holder 108 and one or more welding torches 110 to move in two different directions. The carriage 102 includes a first positioning motor 116 to control the position of the first beam 104, and a second positioning motor 118 to control the position of the carriage along the second beam 106. The first positioning motor 116 and the second positioning motor 118 can be, for example, a cassette type motor. In one example, the first beam 104 extends along a y-axis (first axis) 120, and the second beam 106 extends along an x-axis (second axis) 122. To position the welding torch holder 108 (and the one or more welding torches 110 mounted thereon) along the y-axis 120, the first positioning motor 116 operates to engage the first beam 104 and position the first beam 104 along the y-axis 120. To position the welding torch holder 108 (and the one or more welding torches 110 mounted thereon) along the x-axis 122, the second positioning motor 118 operates to engage the second beam 106 and position the carriage 102 along the x-axis 122. In certain embodiments, the second beam 106 can be fixed in a stationary position relative to a workpiece. In certain examples, the second beam 106 can be mounted to a table, the ground, or any other fixed structure. In other examples, the second beam 106 can be mounted to a mobile structure such as a cart, a mobile workstation, or a vehicle. The operation of the first positioning motor 116 and second positioning motor 118 is described in more detail below in reference to FIG. 4.

Figure 2:
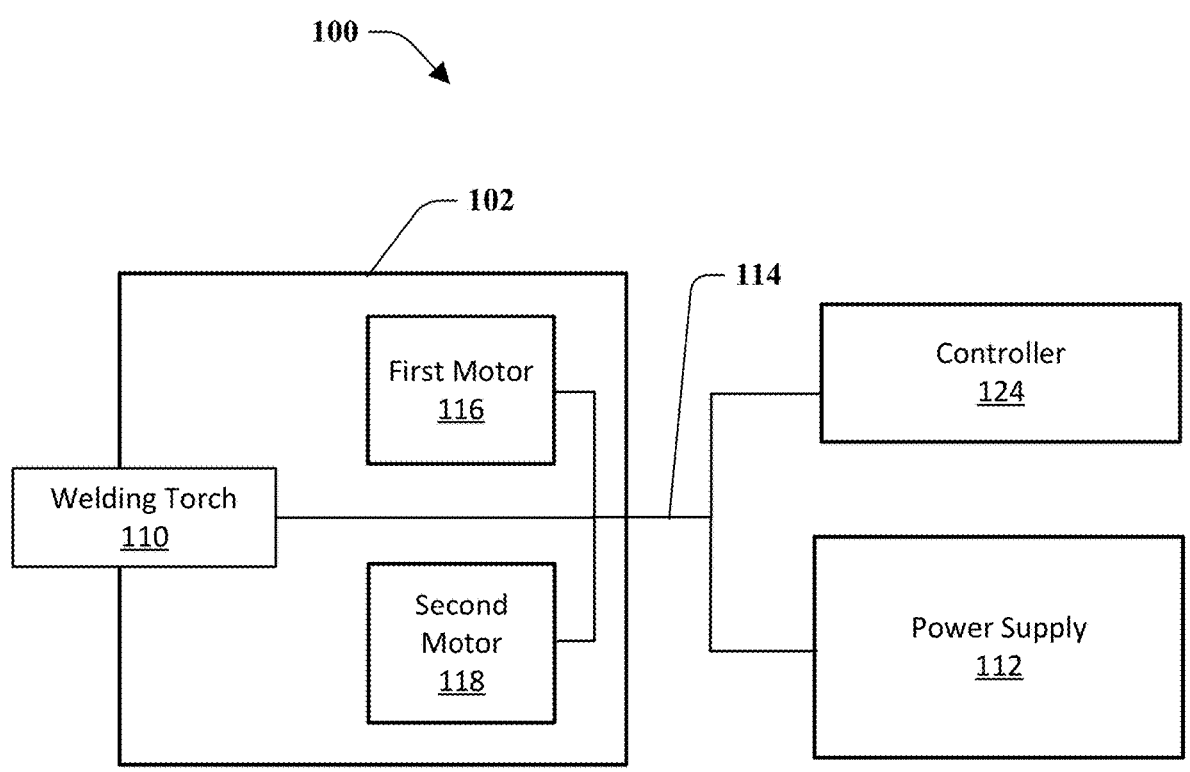
FIG. 2 is a schematic representation of an exemplary welding system.

FIG. 2 depicts a schematic drawing of welding system 100. Power supply 112 can provide welding power to the welding torch 110 via supply cables 114. Additionally, the power supply 112 can provide operating power and/or control power to the first positioning motor 116 and the second positioning motor 118. The welding system 100 can also include a controller 124 configured to provide position control signals to the first positioning motor 116 and second positioning motor 118, and to receive position feedback from the first positioning motor 116 and second positioning motor 118. The controller can include a processor and a memory. The controller 124 can be a standalone controller or it can be included as part of the power supply 112, a separate computer, or included on the carriage 102. The controller 124 can store a series of position commands such that the controller 124 can automatically control the position of the one or more welding torches 110 over time by providing control signals to the first positioning motor 116 and the second positioning motor 118 according to a preprogrammed routine. The controller 124 can also operate as part of a closed-loop control system by receiving position feedback signals from at least one of the first positioning motor 116 or the second positioning motor 118. In other words, the controller 124 can receive position feedback signals and can determine appropriate control signals for the first positioning motor 116 and the second positioning motor 118 based on the received position feedback. Controller 124 may communicate with the first positioning motor 116 and the second positioning motor 118 through a wired connection or through wireless communications. In one embodiment, the controller 124 has a wired connection to one or both of the first positioning motor 116 and the second positioning motor 118. The wired connection can be combined as part of the supply cables 114 or the wired connection can be independent of the supply cables 114.

Figure 3:
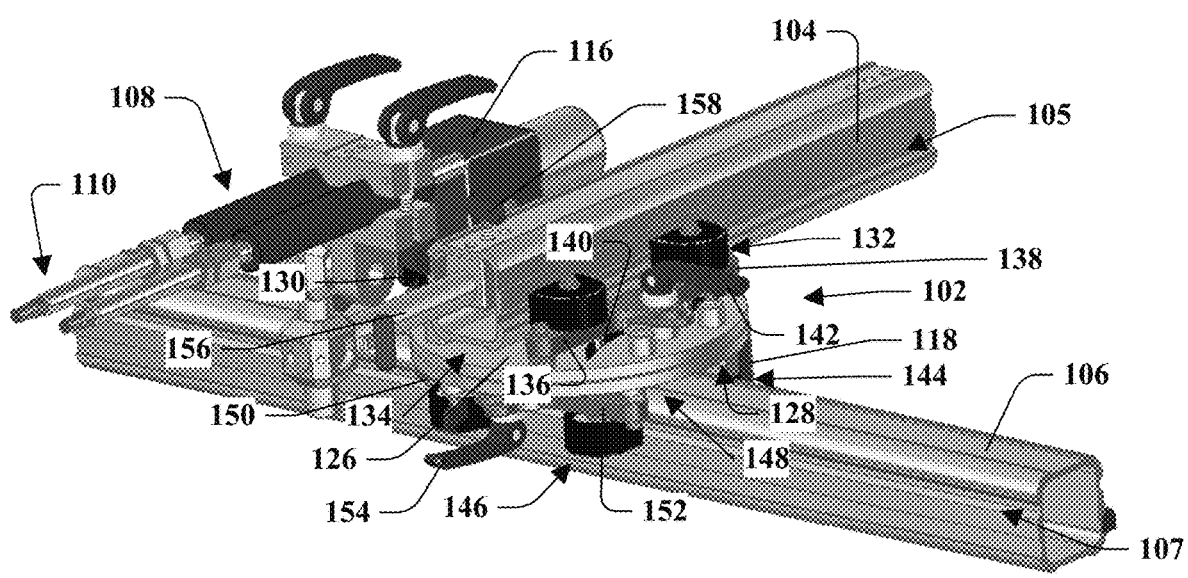
FIG. 3 is a perspective view of an exemplary welding system.

Turning now to FIG. 3, the carriage 102 includes a top surface 126 and a bottom surface 128. The carriage further includes a first set of wheels 130 and a second set of wheels 132 coupled to the top surface 126. The second set of wheels 132 are spaced apart from the first set of wheels 130 to create a first beam channel 134 (better seen in FIG. 6). The first beam 104 extends through the first beam channel 134 and engages with the first set of wheels 130 and the second set of wheels 132 such that the first set of wheels 130 and the second set of wheels 132 can guide the first beam 104 through the first beam channel 134 as the first positioning motor 116 moves the first beam 104. In certain embodiments, the first beam 104 can include one or more grooves 105 extending along one or both sides of the first beam 104. The grooves 105 can function as a guide or a track for the first set of wheels 130 and the second set of wheels 132 as the first beam is moved by the first positioning motor 116 through the first beam channel 134.

The carriage can also include a first link 136 pivotally attached at one end to the top surface 126 of the carriage 102, and a second link 138 pivotally attached at one end to the top surface 126 of the carriage 102. A first wheel of the second set of wheels 132 can be mounted to the top of the first link 136 and a second wheel of the second set of wheels 132 can be mounted to the top of the second link 138. A first wheel spring 140 can be coupled to at least one of the first link 136 or the second link 138 such that the first wheel spring 140 outwardly biases at least one of the first link 136 or the second link 138 towards a perimeter of the carriage 102. A first locking lever 142 includes a post that extends through overlapping ends of the first link 136 and the second link 138. The first locking lever 142 is configured to clamp the first link 136 and the second link 138 in place while in a lowered position. The functionality of the links 136, 138 and locking lever 142 is described in more detail below with reference to FIG. 7.

The bottom surface 128 of the carriage 102 can include similar components as the top surface 126. In one embodiment, a third set of wheels 144 and a fourth set of wheels 146 are coupled to the bottom surface 128 of the carriage 102. The fourth set of wheels 146 are spaced apart from the third set of wheels 144 to create a second beam channel 148. The second beam 106 extends through the second beam channel 148 along an axis that is perpendicular to the first beam 104. The second beam 106 engages with the third set of wheels 144 and the fourth set of wheels 146 such that the third set of wheels 144 and the fourth set of wheels 146 can guide the carriage 102 along the second beam 106 as the second positioning motor 118 moves the carriage 102 along the second beam 106. In certain embodiments, the second beam 106 can include one or more grooves 107 extending along one or both sides of the second beam 106. The grooves 107 can function as a guide or a track for the third set of wheels 144 and the fourth set of wheels 146 as the carriage 102 is moved along the second beam 106 by the second positioning motor 118.

The carriage can also include a third link 150 pivotally attached at one end to the bottom surface 128 of the carriage 102, and a fourth link 152 pivotally attached at one end to the bottom surface 128 of the carriage 102. A first wheel of the fourth set of wheels 146 can be mounted to the top of the third link 150 and a second wheel of the fourth set of wheels 146 can be mounted to the top of the fourth link 152. A second wheel spring (not shown) can be coupled to at least one of the third link 150 or the fourth link 152 such that the second wheel spring outwardly biases at least one of the third link 150 or the fourth link 152 towards a perimeter of the carriage 102. A second locking lever 154 includes a post that extends through overlapping ends of the third link 150 and the fourth link 152. The second locking lever 154 is configured to clamp the third link 150 and the fourth link 152 in place while in a lowered position.

In an embodiment, the welding torch holder 108 can be mounted to a telescoping rail 156. The telescoping rail 156 can extend from within the first beam 104 in a telescopic manner. The telescoping rail 156 can be extended outwards or retracted inwards by a user and locked in place by a locking screw 158 that extends through the first beam 104 to secure the telescoping rail 156 in place. It should be appreciated that the locking screw 158 can include any other type of hardware capable of securing the telescoping rail 156 in place within the first beam 104. For example, the locking screw 158 can also be a wing nut or a spring-loaded bolt. The locking screw 158 can secure the telescoping rail 156 in place with respect to the first beam 104 by compressing the telescoping rail 156 and thus securing the telescoping rail 156 with friction, or the locking screw 158 can extend through the first beam 104 and a hole in the telescoping rail 156 to secure the telescoping rail 156 in place. In certain embodiments, the telescoping rail 156 can include a plurality of holes arranged along the top of the telescoping rail 156 such that the locking screw 158 can be inserted into one of the plurality of holes depending on how far the telescoping rail 156 is extended. In these embodiments, a user can select a desired length of extension of the telescoping rail 156 and insert the locking screw 158 into a hole of the plurality of holes that corresponds to the desired length.

Figure 4:
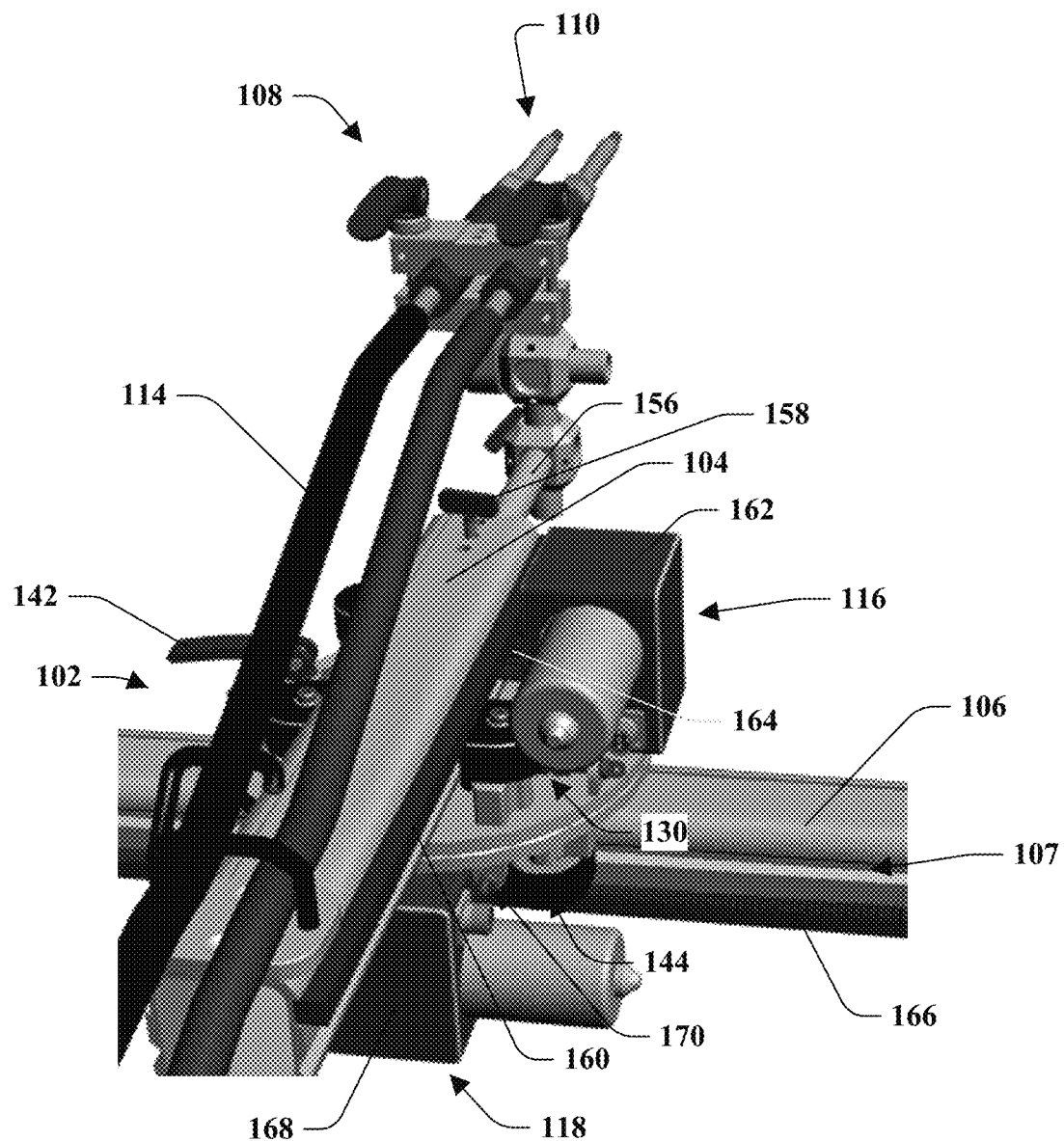
FIG. 4 is a rear perspective view of an exemplary carriage of a welding system.

Turning now to FIG. 4, the first beam 104 includes a rack 160 that extends along a side of the first beam 104. The rack 160 has a series of teeth configured to receive and engage with a gear. First positioning motor 116 includes a casing 162 and a pinion gear 164 extending through the casing 162. The pinion gear 164 is positioned to engage with the rack 160 on the first beam 104. In one embodiment, the rack 164 engages with the top of the pinion gear 164. When the first positioning motor 116 operates, the pinion gear 164 turns, engaging the rack 164 and causing the first beam 104 to move through the first beam channel 134.

Similarly, the second beam 106 includes a rack 166 that extends along a side of the second beam 106. The rack 166 has a series of teeth configured to receive and engage with a gear. Second positioning motor 118 includes a casing 168 and a pinion gear 170 extending through the casing 168. The pinion gear 170 is positioned to engage with the rack 166 on the second beam 106. In one embodiment, the rack 166 engages with the bottom of the pinion gear 164. When the second positioning motor 118 operates, the pinion gear 170 turns, engaging the rack 166 and causing the carriage 102 to move in a direction along the second beam 106.

Figure 5:
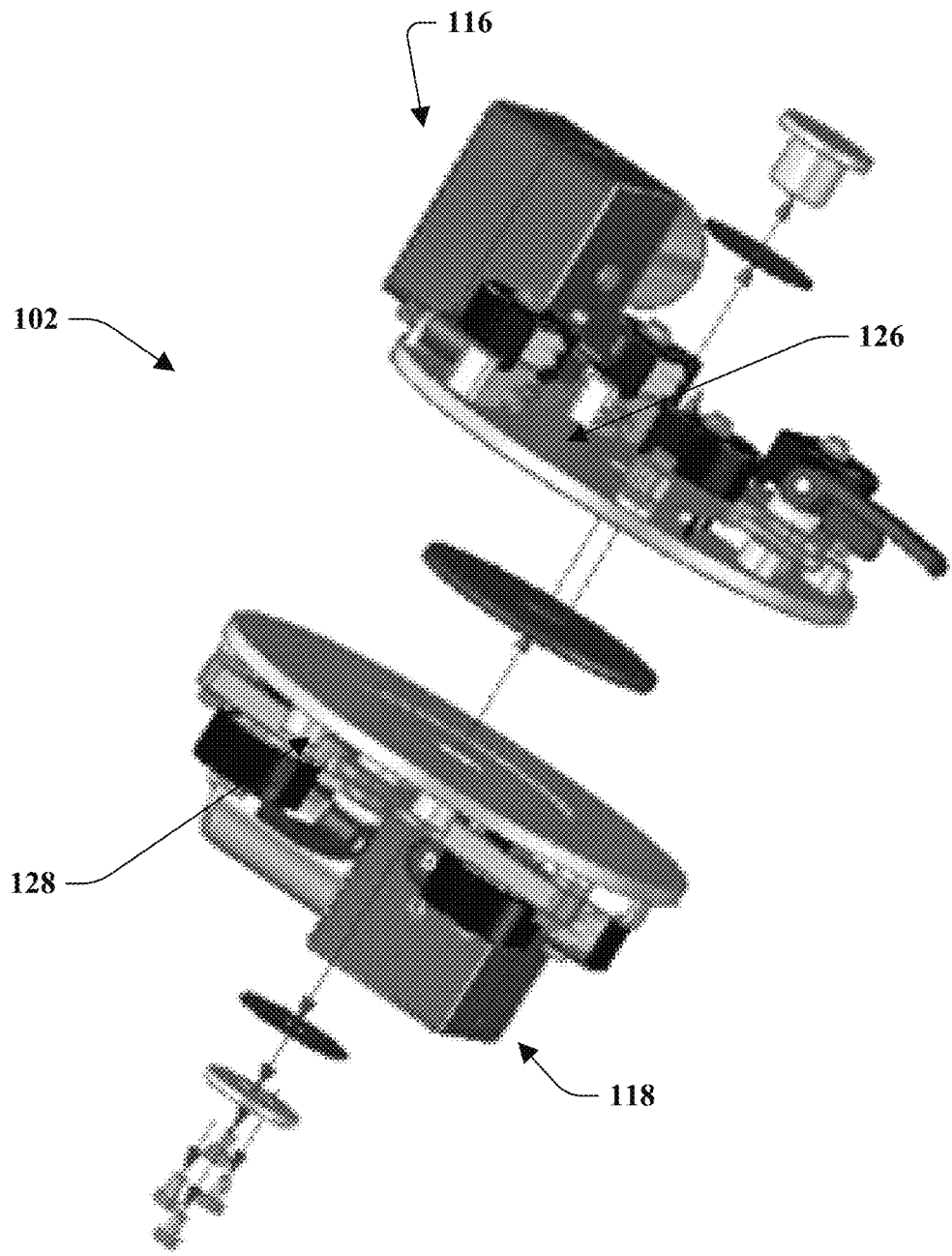
FIG. 5 is an exploded view of an exemplary carriage of a welding system.

Turning now to FIG. 5, in one embodiment, the carriage 102 can be constructed from two discs pressed together and secured by hardware such as plates, bolts, and/or screws. In this embodiment, the top surface 126 of the carriage 102 is on a first disc and the bottom surface 128 of the carriage 102 is on a second disc. In another embodiment, the carriage 102 is constructed from a single disc such that the top surface 126 and bottom surface 128 are on opposing sides of the same disc. It should be appreciated that the carriage can be based on surfaces of any shape. While the carriage 102 can be constructed on a disc platform as shown, the carriage 102 can also be constructed on a platform that is a rectangle, a square, a triangle, an oval, among other shapes.

Figure 6:
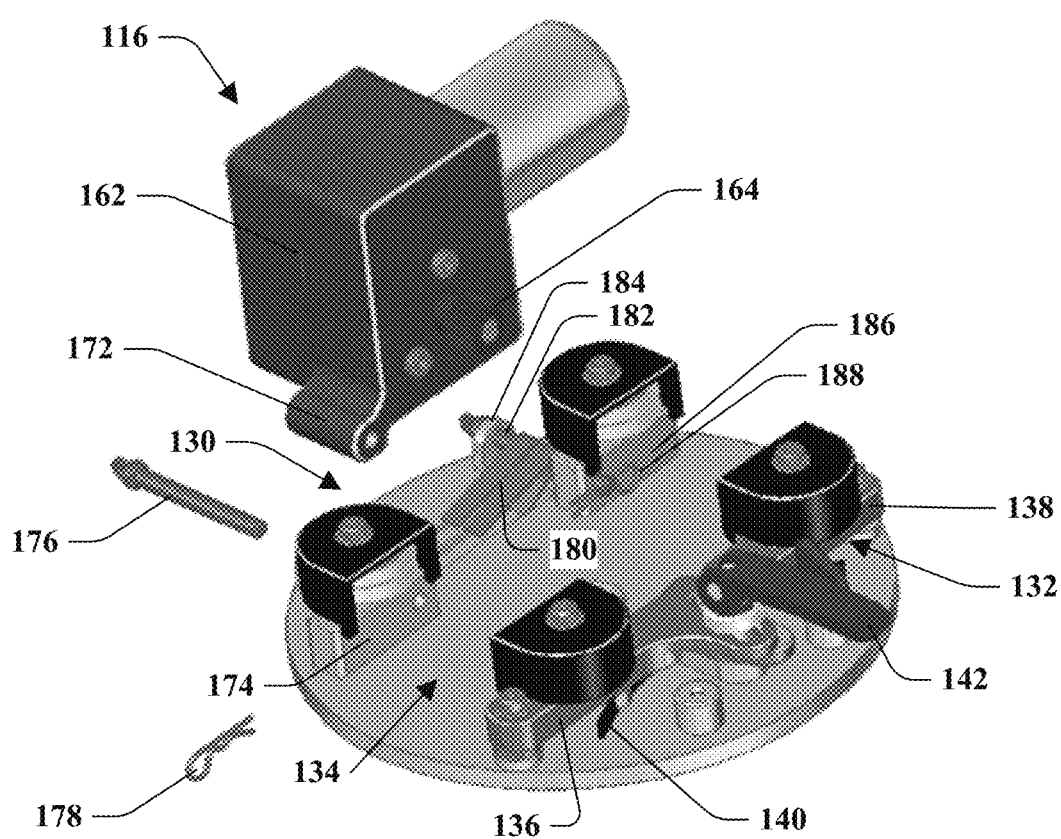
FIG. 6 is a perspective view of an exemplary carriage of a welding system with a positioning motor removed.

Turning now to FIG. 6, the first positioning motor 116 is shown along with hardware that can be used to mount the first positioning motor 116 to the carriage 102. It should be appreciated that while the description of FIG. 6 pertains to the first positioning motor 116 on the top surface 126, the description can also apply similarly regarding the second positioning motor 118 on the bottom surface 128. The first positioning motor 116 can be removeably coupled to the carriage 102 such that the pinion gear 164 of the first positioning motor 116 is positioned to engage the rack 160 extending along the first beam 104. The first positioning motor 116 can include a pin aperture 172. The carriage 102 can include a first motor mount 174 projecting from the top surface 126 of the carriage 102. In certain embodiments, a wheel from one of the first set of wheels 130 or the second set of wheels 132 can be mounted on the first motor mount 174. The first positioning motor 116 can be mounted to the carriage 102 by a first pin 176 removeably inserted through the first positioning motor's 116 pin aperture 172 and the first motor mount 174. An R-clip 178 can be inserted through a hole in one end of the first pin 176 to retain the first pin 176 in place within the pin aperture 172 and the first motor mount 174. The carriage 102 can also include a motor spring 180 mounted or coupled to the top surface 126 of the carriage 102 by a spring pin 182. The spring pin 182 can be inserted through a spring pin mount 184 that is mounted to the top surface 126 of the carriage, the motor spring 180, and a wheel mount 186 that is mounted to the top surface 126 of the carriage 102. The spring pin 182 can be secured in place with a spring pin R clip 188 inserted through an end of the spring pin 182. The motor spring 180 can be located beneath the first positioning motor 116 and provides an upward bias in order to pivot the first positioning motor 116 upward about the first pin 176 to ensure that the pinion gear 164 makes contact with and engages the rack 160 on the first beam 104.

A user can install the first positioning motor 116 by aligning the pin aperture 172 with the hole in the first motor mount 174. The user can then insert the first pin 176 through the pin aperture 172 and the hole in the first motor mount 174. The user can then insert the R-clip 178 through the hole in the end of the pin 176. A user can remove and replace the first positioning motor 116 by removing the R-clip 178 from the first pin 176. Next, the user can remove the first pin 176 from the pin aperture 172 and the first motor mount 174. The first positioning motor 116 may then simply be removed and replaced with a new positioning motor. It should be appreciated that the second positioning motor 118 can be installed, removed, and replaced in the same manner with the same respective hardware as described with respect to the first positioning motor 116.

Figure 7:
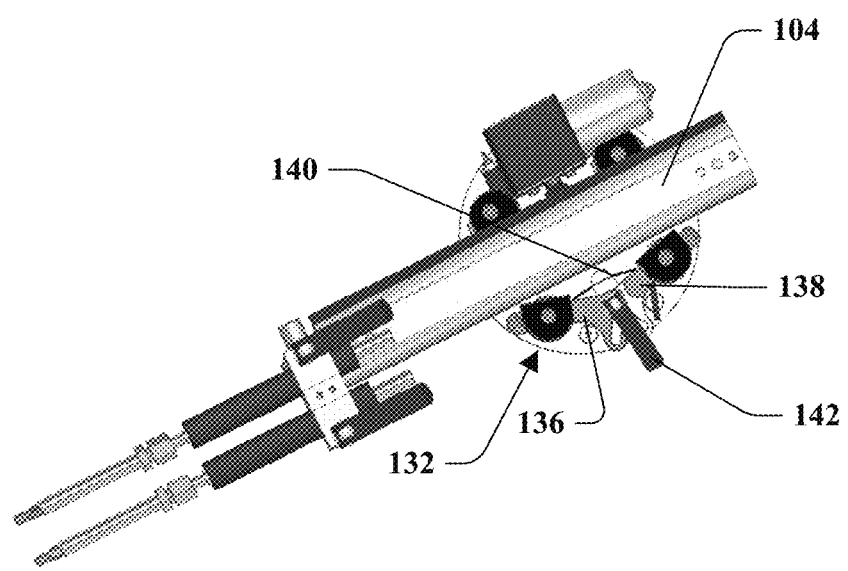
FIG. 7 is a top view of an exemplary welding system.

In various embodiments, the first beam 104 and the second beam 106 can be released and removed from their respective beam channel. As the first positioning motor 116, the second positioning motor 118, the first beam 104, and the second beam 106 can all be released from the carriage 102 by a user, the first positioning motor 116 is releasably engaged with the first beam 104 and the second positioning motor 118 is releasably engaged with the second beam 106 while the welding system 100 is in operation. Turning to FIG. 7, the first link 136 and the second link 138 are movable such that the second set of wheels 132 mounted on the first link 136 and second link 138 can pivot towards the perimeter of the carriage 102 and away from the first beam 104. This movement can release and disengage the second set of wheels 132 from the first beam 104, which allows a user to remove the first beam 104 from the first beam channel 134. The first wheel spring 140 can be a leaf type spring that biases the first link 136 and second link 138 outwards towards the perimeter of the carriage 102. The first locking lever 142 includes a post that extends through both the first link 136 and the second link 138. When the first locking lever 142 is in a raised position, the links are moveable between a first position, where the second set of wheels 132 are aligned to engage an edge of the first beam 104, and a second position (as depicted in FIG. 7) where the second set of wheels are pivoted outwards towards the perimeter of the carriage. While the second set of wheels 132 is in the second position, the first beam 104 can be removed from the first beam channel 134. When the first locking lever 142 is in the lowered position, the first locking lever 142 clamps the first link 136 and the second link 138 in place, and therefore securing the second set of wheels 132 in place. It should be appreciated that the bottom surface 128 of the carriage includes similar features that interact the same way in order to engage, release, disengage, or remove the second beam 106.

Figure 8:
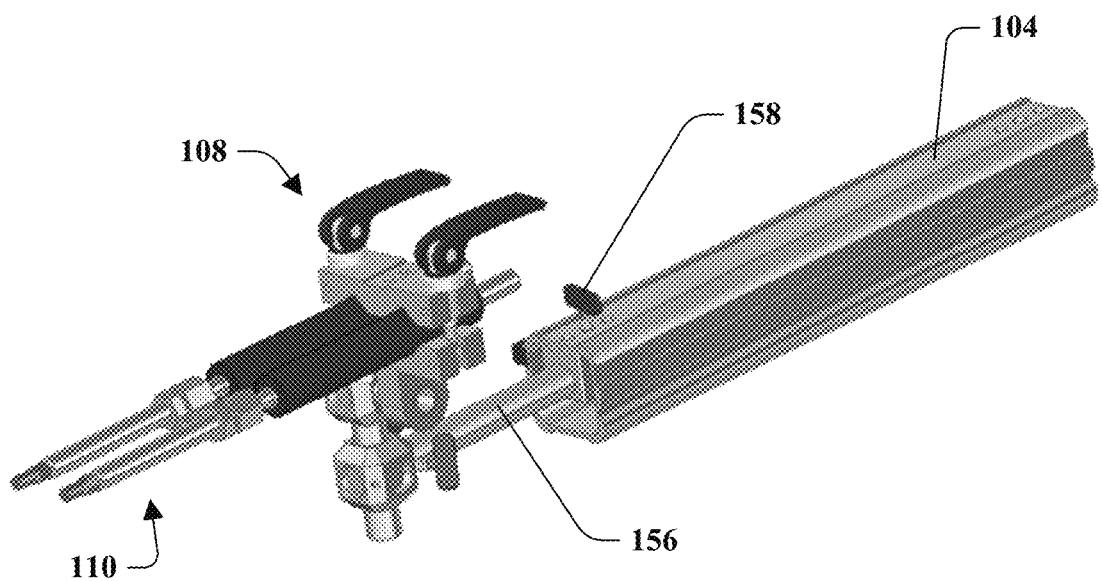
FIG. 8 is a perspective view of an exemplary welding torch holder of the welding system in a first position.
Figure 9:
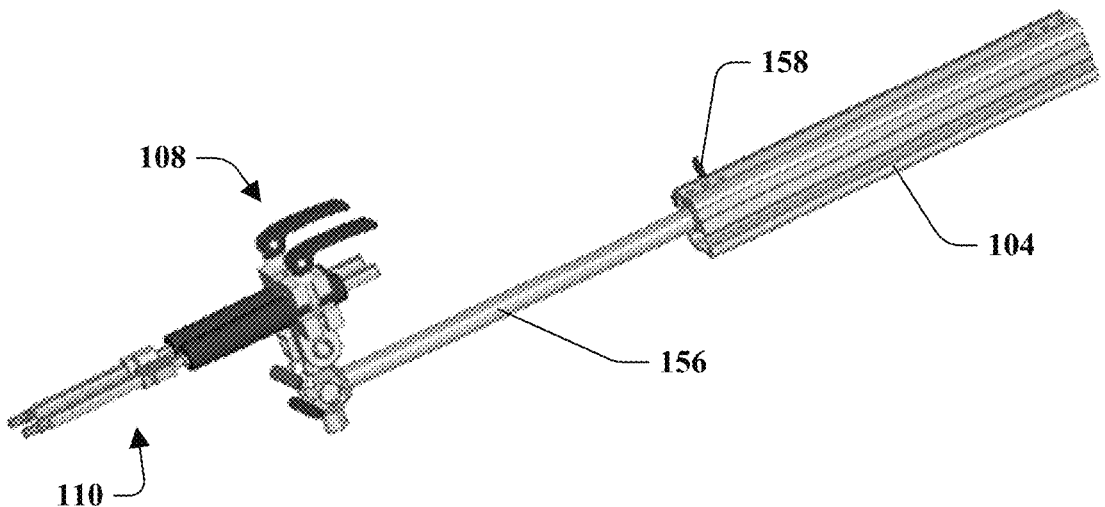
FIG. 9 is a perspective view of the exemplary welding torch holder of the welding system in an extended second position.

As shown in FIGS. 8 and 9, the telescoping rail 156 is moveable between a retracted position as depicted in FIG. 8, and an extended position depicted in FIG. 9. The locking screw 158 can extend through the first beam 104 and can lock the telescoping rail 156 in place. A user can loosen or remove the locking screw 158, manually extend or retract the telescoping rail 156 within the first beam 104, and tighten or insert the locking screw 158 to secure the telescoping rail 156 in place. The locking screw 158 can secure the telescoping rail 156 in place by way of compressing the telescoping rail 156 or by being inserted through a hole in the telescoping rail 156. In certain embodiments, the telescoping rail can having a plurality of holes for receiving the locking screw 158. Each hole of the plurality of holes can correspond to a different extension length. The telescoping rail 156 eliminates the need for a longer first beam 104 where extended reach is required for a particular weld. In certain embodiments, the length of extension of the telescoping rail 156 can be determined by one or more position sensors and communicated to the controller 124. Information regarding the extension of the telescoping rail 156 can be used by the controller 124 in determining position control signals for the first positioning motor 116 and the second positioning motor 118.

It is to be appreciated that various features or aspects of the embodiments described herein can be utilized in any combination with any of the other embodiments.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A welding system comprising:
   a carriage having a top surface and a bottom surface;
   a first set of wheels coupled to the top surface of the carriage;
   a second set of wheels coupled to the top surface of the carriage and spaced apart from the first set of wheels to create a first beam channel;
   a first beam comprising a rack that extends along a side of the first beam, the first beam extending through the first beam channel and engaging with the first set of wheels and the second set of wheels; and
   a first positioning motor comprising a pinion gear;
   wherein the first positioning motor is removably coupled to the carriage such that the pinion gear is positioned to engage the rack extending along the first beam, and wherein the welding system further comprises:
   a first link pivotally attached at one end to the top surface of the carriage, wherein a first wheel of the second set of wheels is mounted to the first link;
   a second link pivotally attached at one end to the top surface of the carriage, wherein a second wheel of the second set of wheels is mounted to the second link;
   a first wheel spring coupled to at least one of the first link or the second link such that the first spring outwardly biases at least one of the first link or the second link towards a perimeter of the carriage; and
   a first locking lever having a post that extends through overlapping ends of the first link and the second link, wherein the first locking lever is configured to clamp the first link and the second link in place while in a lowered position.

2. The welding system of claim 1, further comprising:
   a first motor mount projecting from the top surface of the carriage;
   wherein the first positioning motor further comprises a pin aperture, and the first positioning motor is removably coupled to the carriage by a first pin removably inserted through the pin aperture of the first positioning motor and the first motor mount.

3. The welding system of claim 2, further comprising:
   a first motor spring coupled to the top surface of the carriage, wherein the first motor spring provides an upward bias to pivot the first positioning motor upward about the first pin to maintain contact between the pinion gear and the rack on the first beam.

4. The welding system of claim 2, wherein a first wheel of the first set of wheels is mounted on the first motor mount.

5. The welding system of claim 2, further comprising:
   a third set of wheels coupled to the bottom surface of the carriage;
   a fourth set of wheels coupled to the bottom surface of the carriage and spaced apart from the third set of wheels to create a second beam channel;
   a second beam comprising a rack that extends along a side of the second beam, the second beam extending through the second beam channel perpendicular to the first beam, and engaging with the third set of wheels and the fourth set of wheels; and
   a second positioning motor comprising a pinion gear;
   wherein the second positioning motor is removably coupled to the carriage such that the pinion gear of the second positioning motor is positioned to engage the rack extending along the second beam.

6. The welding system of claim 5, further comprising:
   a controller configured to provide position control signals to at least one of the first positioning motor or the second positioning motor.

7. The welding system of claim 5, further comprising:
   a second motor mount projecting from the bottom surface of the carriage;
   wherein the second positioning motor further comprises a pin aperture, and the second positioning motor is removably coupled to the carriage by a second pin removably inserted through the pin aperture of the second positioning motor and the second motor mount.

8. The welding system of claim 7, wherein a first wheel of the third set of wheels is mounted on the second motor mount.

9. The welding system of claim 1, further comprising:
   a welding torch holder coupled to a telescoping rail, wherein the telescoping rail extends from the first beam.

10. The welding system of claim 9, wherein the telescoping rail is configured to be locked in place with respect to the first beam by a locking screw that extends through the first beam.

11. The welding system of claim 1, wherein when the first locking lever is in a raised position, the first link and the second link are moveable between a first position where the second set of wheels are aligned to engage the first beam, and a second position where the second set of wheels are pivoted outwards towards the perimeter of the carriage.

12. The welding system of claim 11, wherein when the first link and the second link are in the second position, the second set of wheels are disengaged from the first beam such that the first beam can be removed from the first beam channel.

* * * * *